United States Patent Office 3,553,962
Patented Jan. 12, 1971

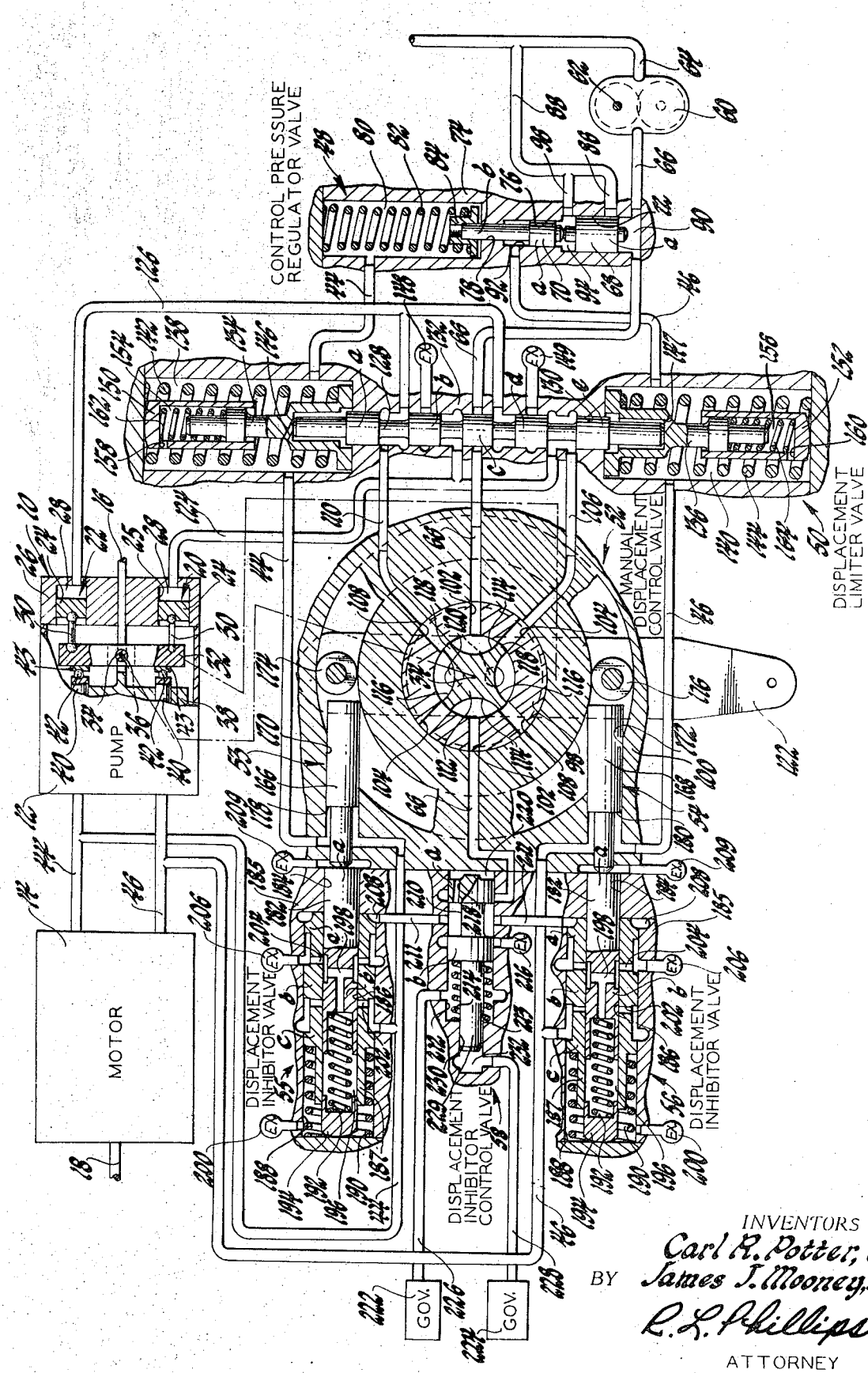

3,553,962
HYDROSTATIC DISPLACEMENT CONTROL SYSTEM
Carl R. Potter and James J. Mooney, Jr., Indianapolis, Ind., assignors to General Motors Corporation, Detroit, Mich., a corporation of Delaware
Filed May 19, 1969, Ser. No. 825,797
Int. Cl. F15b 15/18
U.S. Cl. 60—19       8 Claims

ABSTRACT OF THE DISCLOSURE

A hydrostatic displacement control system for controlling the pump displacement in a hydrostatic unit comprises a control pressure regulator valve which provides a control pressure according to high hydrostatic system pressure. A displacement control valve using this control pressure normally provides pressure control at two displacement control motors to control the angular position of a swash plate which determines the hydrostatic pump displacement. A displacement limiter valve interrupts the control of the displacement control valve to limit hydrostatic system pressure by providing a different pressure bias to the displacement control motors. Two load feel devices having a hydrostatic system pressure bias operate on the displacement control valve to provide the operator with feel of the load. Two displacement inhibitor valves in cooperation with a displacement inhibitor control valve operate on the displacement control valve to limit pump displacement according to engine speed and output speed.

---

This invention relates to hydrostatic displacement control systems and more particularly to hydrostatic displacement control systems for controlling hydrostatic pump displacement in a variable ratio hydrostatic unit.

The hydrostatic displacement control system according to the present invention is illustrated as providing pump displacement control for a variable ratio hydrostatic unit used to provide steer bias in a tracklaying vehicle transmission which provides steering by enforcing a differential speed between the transmission's two outputs. Two displacement control motors are connected to control the angle of the swash plate in the hydrostatic pump, these motors being operable by pressure control to vary the swash plate angle and thus vary pump displacement. A control pressure regulator valve provides fluid at a regulated control pressure which is used to operate the displacement control motors. The control pressure regulator valve is responsive to pressure in both of the hydrostatic system lines to increase the control pressure with increasing hydrostatic system pressure regardless of which hydrostatic system line is operating at high pressure.

A manually operated displacement control valve normally controls the delivery of control fluid to the displacement control motors. The displacement control valve by controlling the pressure differential at the displacement control motors positions the spash plate at the desired angle to effect the proper pump displacement to produce the required hydrostatic motor output speed and direction for effecting the steer demanded. A displacement limiter valve in its normal condition provides the normal fluid connections between the displacement control valve and the displacement control motors. The displacement limiter valve is responsive to the prevailing high hydrostatic system pressure in either one of the hydrostatic system pressure lines to interrupt the normal control of the displacement control valve and provide a differential pressure bias at the displacement control motors. The displacement limiter valve then acts to directly control pump displacement and thus the quantity of fluid pumped to limit high hydrostatic system pressure to a predetermined value rather than bypassing excessive pump flow upon excessive load demands on the hydrostatic system.

Two load feel devices, each responsive to the pressure in one of the hydrostatic system lines, are arranged so that one of the devices responds to the prevailing high hydrostatic system pressure and acts on the displacement control valve to provide the operator with a feel of the load regardless of hydrostatic motor output direction so that he can react accordingly during steering operation. A displacement inhibitor control valve provides a pressure which increases with increasing engine speed and output speed and this pressure is utilized as a bias to determine when two displacement inhibitor valves will provide an inhibiting force derived from the prevailing high hydrostatic system pressure. The displacement inhibitor valves are arranged so that the inhibiting force from one of these valves is always available to act on the displacement control valve to inhibit increased pump displacement according to engine speed and output speed to prevent stalling the engine during low engine speed and low output speed operation during steering.

An object of the present invention is to provide a new and improved hydrostatic displacement control system.

Another object is to provide in a hydrostatic displacement control system for controlling pump displacement of a hydrostatic unit a displacement control valve for normally controlling pump displacement and a displacement limiter valve responsive to the prevailing high hydrostatic system pressure to interrupt the normal control of the displacement control valve and provide a different and direct control bias to control pump displacement to limit hydrostatic system pressure.

Another object is to provide in a hydrostatic displacement control system for controlling pump displacement of a hydrostatic unit load feel devices responsive to the prevailing high hydrostatic system pressure to act on a displacement control valve to provide the operator with a feel of the load.

Another object is to provide in a hydrostatic displacement control system for controlling the pump displacement of a hydrostatic unit a displacement inhibitor valve providing a pressure indicative of engine performance and/or output speed and a displacement inhibitor regulator valve responsive to this pressure to determine the establishment of a force derived from hydrostatic system pressure to act on a displacement control valve to inhibit pump displacement according to engine performance and/or output speed.

These and other objects of the present invention will be more apparent from the following description and drawing in which:

The drawing schematically shows a hydrostatic displacement control system according to the present invention.

HYDROSTATIC DRIVE ARRANGEMENT

The hydrostatic displacement control system according to the present invention provides pump displacement control for a variable ratio hydrostatic unit. This control system may be used, for example, in controlling the hydrostatic steer unit in a tracklaying vehicle transmission arrangement of the type disclosed in U.S. Pat. No. 3,373,636, issued May 19, 1968 to Livezey et al. and entitled "Vehicle Transmission Including Steering by Driving." Referring to the drawing, there is shown a variable ratio hydrostatic unit indicated generally at 10 of a conventional type comprising a variable displacement pump 12 and a fixed displacement motor 14. For use in the transmission arrangement disclosed in the above-mentioned Livezey et al. patent, the input shaft 16 of the pump is driven by the vehicle's engine and the output shaft 18 of the motor is connected to drive the steer producing components of the transmission arrangement. The steer bias in this transmission arrangement is determined by the speed and rotational direction of the motor output shaft 18. When the speed of the motor output shaft 18 is zero, no steer bias is produced. When the motor output shaft 18 is driven, there is provided steer bias with this steer bias (differential speed of the transmission's two outputs) increasing with increasing motor output speed and the rotational direction of the motor output determining the direction the vehicle turns. For a more detailed description of the driving connections of the hydrostatic unit in this particular transmission arrangement and its operation as a steer producing device, reference should be made to the above-mentioned Livezey et al. patent.

Pump displacement which determines the speed and direction of the motor output is controlled by two displacement control motors indicated generally at 20 and 22. The displacement control motor 20 comprises a piston 24 mounted for axial movement in a cylinder 25 in the pump housing 26, the piston being operated by fluid pressure admitted to a chamber 28. The piston 24 acts through a connecting rod 30 on a swash plate 32 which is supported by a trunnion 34 on pump housing 26, the piston's force being in a direction to turn the swash plate clockwise about axis 36 of the trunnion. The other displacement control motor 22 has similar structure with corresponding parts identified by the same numerals and is located so that when it is supplied with fluid pressure, it provides a force to turn or tilt the swash plate 32 in the opposite or counterclockwise direction. The pump input shaft 16 extends freely through swash plate 32 and is connected to drive the rotary cylinder block 38 of the pump. Pistons 40 mounted in cylinder block 38 are stroked through ball and socket drives 42 each having a slipper 43 contacting the face of swash plate 32. With the stroke of pistons 40 and thus the pump's displacement determined by the angle of swash plate 32, the pump 12 delivers fluid accordingly. When swash plate 32 is in the vertical position shown which may be called the zero pump displacement angle the pump has zero displacement and thus pumps no fluid. When swash plate 32 is turned in the counterclockwise direction from its vertical position, the pump displacement thus effected causes fluid to be pumped through a hydrostatic system line 44 to power motor 14 to drive the motor output shaft 18 in one direction with the other hydrostatic system line 46 returning fluid to the pump. When swash plate 32 is turned in the clockwise direction from its vertical position, the pump displacement thus effected causes fluid to be pumped through hydrostatic system line 46 to power motor 14 to drive motor output shaft 18 in the opposite direction with the other hydrostatic system line 44 then returning fluid to the pump.

HYDROSTATIC DISPLACEMENT CONTROL SYSTEM

The control system for controlling pressure to the displacement control motors 20 and 22 to control the hydrostatic pump's displacement generally comprises a control pressure regulator valve 48, a displacement limiter valve 50, a displacement control valve 52, two load feel devices 53 and 54, two displacement inhibitor valves 55 and 56, and a displacement inhibitor control valve 58.

Control pressure regulator valve

The fluid such as oil used in all of the control functions is supplied at pressure by a positive displacement type pump 60 whose drive shaft 62 is driven by the vehicle's engine and thus is driven when the hydrostatic pump 12 is driven. Fluid enters the intake side of pump 60 through an intake line 64. This intake fluid may already be at some pressure (supercharge pressure) which may be derived, for example, from the pressure used to operate the shift controls of the transmission arrangement. The fluid delivered by intake line 64 is raised in pressure by pump 60 and delivered to a control line 66. The pressure in control line 66 is regulated by the control pressure regulator valve 48.

The control pressure regulator valve 48 comprises two valve elements 68 and 70. Valve elements 68 has a land $a$ mounted in a bore 72 of valve body 74 and valve element 70 has lands $a$ and $b$ mounted in valve body bores 76 and 78, respectively. Land $a$ of valve element 70 has a diameter smaller than land $a$ of valve element 68 and larger than land $b$. In the upper end of valve body 74 there is provided a chamber 80 in which is located a spring 82. The spring 82 is seated at its upper end on the valve body and at its lower end on a valve seat 84 which is mounted on the upper end of land $b$ of valve element 70, land $b$ projecting into chamber 80. Spring 82 is normally under compression and biases the two valve elements 70 and 68 downward. Valve element 68 provides a controlled fluid connection between control line 66 and a branch line 86 of a bypass line 88 which is connected to the pump's intake line 64. The pressure in control line 66 acting in a chamber 90 at the lower end of the valve body and on the lower end of land $a$ of valve element 68 urges this valve element upward against the spring bias to connect control line 66 to branch line 86 to effect pressure regulation in control line 66 according to the spring bias.

The control pressure regulator valve 48 in addition to regulating the control pressure with the spring bias also regulates the control pressure according to the high hydrostatic system pressure which is the hydrostatic pump's outlet pressure. The hydrostatic system pressure lines 44 and 46 are connected at the control pressure regulator valve 48 to chamber 80 and a chamber 92 provided by bore 76 above land $a$ of valve element 70, respectively. The area of land $a$ responsive to pressure in chamber 92 (the differential area of valve element 70 between its lands $a$ and $b$) and the area of land $b$ of valve element 70 responsive to the pressure in chamber 80 are equal. The hydrostatic system pressure adds to the spring bias to increase the pressure in control line 66 with increasing hydrostatic system pressure with this arrangement providing the same control over pressure regulation in control line 66 regardless of which hydrostatic system line is operating with high pressure. Between valve elements 68 and 70 there is a chamber 94 which is connected to another branch line 96 of bypass line 88 for the purpose of bleeding off leakage from hydrostatic system line 46 past land $a$ of valve element 70.

Displacement control valve

Fluid in control line 66 is directed by the displacement control valve 52 to the displacement control motors 20 and 22 in a manner to control the angular position of swash plate 32. The displacement control valve 52 comprises a servo valve element 98 having a sleeve shape rotatably mounted in valve body 100. The servo valve element 98 is centered on axis 36 of trunnion 34 and is suitably connected to swash plate 32 so that it turns with the swash plate about axis 36. Two diametrically opposed fluid pressure delivery ports 102 extending radially through servo valve element 98 are continuously connected by an external channel in the servo valve element to control line 66, this same channel also providing a connection through the valve body for control line 66 as shown. A pair of diametrically opposed fluid pressure control ports 104 extending radially through servo valve element 98 are continuously connected by an external channel in the servo valve element to a feed line 106 which is connected to displacement control motor 20 as described in more detail later. A pair of diametrically opposed fluid pressure control ports 108 extending radially through the servo valve element 98 and at right angles to fluid pressure control ports 104 are continuously connected by an external channel in the servo valve element to a feed line 110 which is connected to the other displacement control motor 22 as described in more detail later.

A manual valve element 112 is rotatably mounted in servo valve element 98 for establishing and controlling connection between certain of these ports. The manual valve element 112 has two pairs of diametrically opposed, longitudinally extending recesses 114 and 116 in its periphery closed by the servo valve element, the pairs being at right angles to each other. The adjacent recesses 114 and 116 are separated by a longitudinally extending land 118 which is slightly larger than the diameter of the ports in servo valve element 98. The recesses 114 are continuously connected to control line 66 by the fluid pressure delivery ports 102 which bisect the angle between ports 104 and 108 and these recesses serve as pressure supply chambers for the fluid pressure control ports 104 and 108. The other recesses 116 serve as exhaust chambers for the fluid pressure control ports 104 and 108, the recesses 116 being connected to exhaust fluid through exhausts 120.

Mechanical linkage for manually operating the displacement control valve 52 includes a lever 122 which is fixed to the manual valve element 112. The lever 122 is adapted for connection by suitable linkage to a hand lever which the operator controls to effect turning of lever 122 and thus turning of the manual valve element 112. The servo valve element 98 and manual valve element 112 are shown in their normal positions relative to each other. In these positions the lands 118 are aligned with the fluid pressure control ports 104 and 108 and there is provided a clearance which permits controlled fluid flow between the recesses 114 containing control pressure and these fluid pressure control ports and between these ports and the exhaust recesses 116. This causes the pressure in control ports 104 and 108 and the respective feed lines 106 and 110 to build to the same value to provide for holding swash plate 32 at its zero pump displacement angle. Then when the manual valve element 112 is turned in either direction, the pressurized recesses 114 are further opened to one of the pairs of fluid pressure control ports 104 and 108 with this one pair then blocked from the exhaust recesses 116 while the other pair of control ports is blocked from the pressurized recesses and further opened to the exhaust recesses.

For example, when the manual valve element 112 is turned clockwise, the pressurized recesses 114 are further opened to fluid pressure control ports 104 and blocked from exhaust recesses 116 while the other control ports 108 are blocked from the pressurized recesses and further opened to the exhaust recesses. This causes a pressure imbalance between the fluid pressure control ports 104 and 108 with the pressure increasing in the former ports and decreasing in the latter ports. With this pressure imbalance at the control ports transmitted by feed lines 106 and 110 to the displacement control motors 20 and 22 as described in more detail later, the displacement control motors operate to turn the swash plate 32 in the clockwise direction and change the hydrostatic pump's displacement accordingly. Since the swash plate 32 is connected to the servo valve element 98, the servo valve element follows the manual valve element 112. When servo valve element 98 catches up with manual valve element 112, the normal relative positions are reestablished with the pressure in both pairs of fluid pressure control ports 104 and 108 providing an equilibrium force to hold the swash plate in position against the pumping forces, the displacement of one displacement control motor having increased and the displacement of the other motor having decreased. Thus, the swash plate is held in its new position corresponding to the advancement of the manual valve element. With the structural symmetry provided, the displacement control valve 52 provides the same type of operation when the manual valve element 112 is turned in the opposite or counterclockwise direction except that now the pressure is increased in fluid pressure control ports 108 and decreased in fluid pressure control ports 104 to change the angle of swash plate 32 accordingly.

Displacement limiter valve

The displacement limiter valve 50 provides controlled connection of the feed lines 106 and 110 from the displacement control valve 52 to motor lines 124 and 126 which are connected to the chambers of the displacement control motors 20 and 22, respectively. The displacement limiter valve 50 is responsive to high hydrostatic system pressure to limit the hydrostatic pump's displacement according to the load on the hydrostatic system. Displacement limiter valve 50 comprises a spool valve element 128 having lands $a$, $b$, $c$, $d$ and $e$ of equal diameter located in a bore 130 of valve body 132. The valve element 128 when in its normal position as shown connects feed line 106 between lands $d$ and $e$ to motor line 124 and connects the other feed line 110 between lands $a$ and $b$ to the other motor line 126. Pistons 134 and 136 in chambers 138 and 140 at opposite ends of valve element 128 are normally held against the valve body by springs 142 and 144, respectively, to trap the valve element 128 and hold it in the normal position.

The hydrostatic system lines 44 and 46 are connected to chambers 128 and 140, respectively. Hydrostatic system pressure in chambers 138 and 140 is transmitted through ports 146 and 147 in pistons 134 and 136, respectively, to act on the opposite ends of valve element 128. Thus, high hydrostatic system pressure which is hydrostatic pump outlet pressure in either line 44 or line 46 provides a force on valve element 128 opposing one of the spring forces. At this point it will be understood that when the prevailing high hydrostatic system pressure is in hydrostatic system line 44, the pressure must be increased in feed line 110 and decreased in feed line 106 to increase pump displacement and thus pump delivery to hydrostatic system line 44. When the prevailing high hydrostatic system pressure is in the other hydrostatic system line 46, the pressure must be increased in feed line 106 and decreased in feed line 110 to increase pump displacement and thus pump delivery to hydrostatic system line 46. The lands on valve element 128 and porting in valve body 132 are arranged so that downward movement of valve element 128 against the bias of spring 144 by the high hydrostatic system pressure in hydrostatic system line 44 at a predetermined limit value will cut off the connection of feed line 110 to motor line 126 with feed line 110 then blocked by land $a$ and motor line 126 connected between lands $a$ and $b$ to an exhaust 148. At the same time the other motor line 124 is blocked by land $d$ from feed line 106 and connected between lands $b$ and $c$ to control line 66. Thus, the pressure in motor line 126 is relieved and the pressure in the other motor line 124 is at full control pressure instead of the normal, opposite pressure imbalance between these motor lines provided by the manual controlled displacement control valve 52 that would be demanding more pump displacement. This pressure imbalance at the displacement control motors 20 and 22 provided by the displacement limiter valve 50 prevents further increase in pump displacement which would increase the pressure in hydrostatic system line 44 and instead rapidly decreases pump displacement and thus the quantity of fluid pumped by hydrostatic pum 12 until the high hydrostatic system pressure falls below the predetermined limit value. When the high hydrostatic system pressure falls below the predetermined limit value, the displacement limiter valve 50 resumes its normal position to restore pump displacement control to the displacement control valve 52.

The displacement limiter valve 50 provides the same type of operation when pressure in the other hydrostatic system line 46 tends to exceed the predetermined limit value. When pressure in hydrostatic system line 46 reaches the predetermined limit value, valve element 128 is moved upward against the bias of spring 142. With valve element 128 moved upward, feed line 106 is blocked by land $e$ and motor line 124 is then connected between lands $d$ and $e$ to ane exhaust 149. At the same time the other motor line 126 is blocked from feed line 110 by land $b$ and connected between lands $c$ and $d$ to control line 66. This establishes a pressure imbalance at displacement control motors 20 and 22 preventing further increase in pump displacement which would increase the pressure in hydrostatic system line 46. This pressure imbalance provided directly by the displacement limiter valve 50 rapidly decreases pump displacement until the high hydrostatic system pressure in line 46 falls below the predetermined limit value. When the high hydrostatic system pressure is sufficiently reduced, the displacement limiter valve 50 resumes its normal condition to restore pump displacement control to displacement control valve 52. Thus, with this arrangement and when hydrostatic system pressure tends to exceed the predetermined limit, the valve element 128 will reach a position tending to limit the pump displacement by its control over the pressure delivered to the displacement control motors.

Vibratory movement of valve element 128 is damped by cylinders 150 and 152 mounted on pistons 134 and 136, respectively. Cylinders 150 and 152 provide damping chambers 154 and 156 which are connected through flow restriction passages 158 and 160 to chambers 138 and 140, respectively. Springs 162 and 164 urge expansion of chambers 154 and 156, respectively.

Load feel devices

The person operating hydrostatic unit 10 is provided with feel of the load by the two load feel devices 53 and 54. The load feel devices 53 and 54 respectively comprise pistons 166 and 168 which are mounted in bores 170 and 172 in the valve body 100 of the displacement control valve 52. Pistons 166 and 168 are arranged to engage lugs 174 and 176, respectively, which are secured to lever 122, these lugs being located at equal radial distances from axis 36 of the lever and on a line passing through the axis. The hydrostatic system lines 44 and 46 are connected to deliver pressure to differential areas 178 and 180 on pistons 166 and 168, respectively. Since counterclockwise movement of lever 122 produces high system pressure in hydrostatic system line 44 and this system pressure acts rightward on piston 166 to oppose leftward movement of lug 174, the operator is thus provided with feel of the load by this resistance to counterclockwise lever movement which resistance increases with increasing high hydrostatic system pressure. The same type of physical sensing of load is provided when lever 122 is moved clockwise with the leftward movement of lug 176 being resisted by the then high hydrostatic system pressure in hydrostatic system line 46 acting rightward on piston 168.

Displacement inhibitor valves

The two displacement inhibitor valves 55 and 56 are connected in series with the pistons 166 and 168, respectively, and act to inhibit turning of the lever 122, these valves permitting increased lever movement as the engine and transmission output speed increase. Describing the displacement inhibitor valve 55, the left end of piston 166 abuts a spool valve element 182 having lands $a$ and $b$ of equal diameter. Land $a$ is mounted at its right end in a bore 184 of valve body 185. The left end of land $a$ and all of land $b$ of valve element 182 are mounted in bore 186 of a spool valve element 187. Valve element 187 has lands $a$, $b$ and $c$ of equal diameter located in valve bore 188 of the valve body. A spring 190 biases the outer valve element 187 rightward to abut the valve body as shown while a spring 192 arranged between valve element 182 and a spring seat 194 abutting the valve body biases valve element 182 rightward against piston 166. The spring seat 194 is mounted in the left end of valve element bore 186 to close this end of the bore to provide a chamber 196 which is connected by a passage 198 in valve element 182 to the area between lands $a$ and $b$ of this valve element. The left end of valve body bore 188 is exhausted by an exhaust 200. When the valve elements 182 and 187 are in their normal relative positions as shown, land $b$ of valve element 182 blocks radial ports 202 in valve element 187 which are open to the area between lands $b$ and $c$ of valve element 187, this area being always connected to the hydrostatic system line 44 as shown. At the same time, the chamber 196 is connected by passage 198 and between lands $a$ and $b$ of valve element 182 to radial ports 204 in valve element 187 which are open to the area between lands $a$ and $b$ of valve element 187. This arta between lands $a$ and $b$ of valve element 187 is always open to an exhaust 206 and thus chamber 196 is exhausted in this condition of the displacement inhibitor valve. Leftward movement of valve element 182 with respect to valve element 187 permits delivery of fluid from hydrostatic system line 44 to chamber 196, such delivery being between lands $b$ and $c$ of valve element 187, through ports 202, between lands $a$ and $b$ of valve element 182 and then through passage 198, passage 198 then being blocked from exhaust 206 by land $a$ of valve element 182 closing ports 204. Pressure in chamber 196 acts on the left end of valve element 182 to oppose further movement of this valve element and thus inhibit further counterclockwise movement of lever 122 which would increase pump displacement. Pressure in a chamber 208 at the right end of valve bore 188 acts leftward on the right end of valve element 187 to oppose the bias of spring 190. An exhaust 209 prevents pressure buildup between valve element 182 and piston 166 which might otherwise result from leakage from the neighboring chamber 208 and hydrostatic system line 44. Pressure in chamber 208 can thus change the position of valve element 187 relative to valve element 182 and therefore change the amount of leftward movement of valve element 182 required to pressurize chamber 196. By this provision it is possible to change the point hibited as described in more detail later. The other dis- at which further increase in pump displacement is inplacement inhibitor valve 56 is like the above described inhibitor valve with corresponding parts identified by like numerals. Valve 56 operates to inhibit clockwise movement of the lever 122 which would increase pump displacement in the opposite sense using pressure from the other hydrostatic system line 46.

Displacement inhibitor control valve

The pressure in chambers 208 of the displacement inhibitor valves 55 and 56 is controlled by the displacement inhibitor control valve 58. Valve 58 is of the downstream regulator type and is fed by the control line 66 as shown and operates on the pressure in a line 211 connected to both chambers 208. Valve 58 comprises a spool valve element 210 having lands $a$ and $b$ of equal diameter located in a bore 212 of valve body 213. A spring 214 provides a small bias to position valve element 210 and has little effect on the regulation provided by this valve. The valve element 210 connects line 211 between lands $a$ and $b$ to either an exhaust 216 or the control line 66, any pressure in line 211 and thus in chambers 208 being transmitted by a flow restriction passage 218 through land $a$ to chamber 220 at the right end of the valve element. Pressure in chamber 220 which may be called a displacement inhibitor control pressure biases the valve element 210 leftward to open the line 211 and thus chambers 208 to exhaust 216 so that in the absence of any significant rightward bias on the valve element 210, the pressure in chambers 208 is essentially zero. Control over this pressure regulation is provided by two governors 222 and 224 of any suitable conventional type. The governor 222 is connected to be driven the same as the hydrostatic pump 12, i.e. by the engine or input to the transmission arrangement, to provide in a governor line 226 a pressure which increases with increasing engine or transmission input speed. The other governor 224 is connected the same as the hydrostatic motor 14 in the transmission arrangement to provide in a governor line 228 a pressure which increases with increasing transmission output speed. The governor line 226 is connected to the left end of valve body bore 212 so that the governor pressure in this line acts rightward on the pressure responsive area of land $b$ of valve element 210, the valve element having a projection 229 which extends into a bore 230 in the valve body and in cooperation with the valve body provides an expansible chamber 232. The other governor line 228 is connected to chamber 232 so that the governor pressure in this line acts rightward on the left end of the valve element projection 229. These governor pressures which are proportional to engine speed and transmission output speed act rightward on these separate areas of valve element 210 to produce proportional pressure increase in line 211 and thus in chambers 208. On the other hand, in the absence of these governor pressures, the pressure in chambers 208 is zero. When the control pressure from displacement inhibitor control valve 58 establishes a leftward bias on valve element 187 of the displacement inhibitor valves 55 and 56 exceeding the opposing bias of spring 190, the valve element 187 in these displacement inhibitor valves moves to the left until the increased spring force due to rate establishes a new equilibrium position. Thus, the leftward movement of the valve element 182 in the displacement inhibitor valves required to effect pressurization of chamber 196 to inhibit further movement of lever 122 and thus further pump displacement is correspondingly increased. As the result, increased pump displacement is permitted by the displacement inhibitor valves as engine and transmission output speed increase.

OPERATION

Control of the direction and speed of hydrostatic motor output shaft 18 which in the use illustrated is to effect steer bias is provided by the operator turning the manual valve element 112 in the displacement control valve 52 from its zero displacement position. This turning is in the direction required to produce the desired direction of motor output and to the extent required to produce the desired motor output speed to effect the steer operation desired, valve 52 thus operating as a steer valve. The displacement control valve 52 operates to increase the pressure to one of the displacement control motors 20 and 22 while decreasing the pressure to the other motor to turn the swash plate 32. This causes the hydrostatic pump 12 to pump fluid to one of the hydrostatic system lines 44 and 46 to drive the hydrostatic motor 14 while the other system line serves as a return line to the pump with the swash plate angle and thus displacement depending on the hydrostatic motor output speed demanded by the operator. The swash plate 32 is prevented from further turning by the displacement control valve 52 reestablishing the holding pressure at motors 20 and 22 as soon as the swash plate reaches the angle which matches the angle through which the manual valve element 112 was turned.

The pressure produced by the hydrostatic pump 12 in either hydrostatic system line 44 or 46 which is referred to as high hydrostatic system pressure depends upon which one of these lines is receiving fluid from the pump and varies with the load on the motor output shaft 18. The high hydrostatic system pressure varies with load and in the illustrated use thus varies with the effort required to produce the steer bias and the demand placed on the control pressure in line 66 to effect the hydrostatic pump displacement control varies accordingly. The control pressure regulator valve 48 with its hydrostatic system pressure bias increases the control pressure in control line 66 with increasing high hydrostatic system pressure so that the pressure for operating the displacement control motors 20 and 22 to turn the swash plate 32 in either direction is matched to the load to efficiently meet the displacement control requirements.

The displacement limiter valve 50 under normal load conditions which are the normal steer conditions in the illustrated use remains in the position shown to permit normal control of the displacement control motors 20 and 22 by the displacement control valve 52. During a steer condition where the hydrostatic system would otherwise be overloaded, the high hydrostatic system pressure conditions the displacement limiter valve 50 to interrupt the normal control of the displacement control valve 52 over the displacement control motors. On such interruption the displacement limiter valve 50 limits the high hydrostatic system pressure to a predetermined value suitable to the hydrostatic system's structure and/or the engine's torque characteristics through direct control of the quantity of the fluid pumped. For example, when the hydrostatic system pressure in line 44 tends to exceed this predetermined value signifying an excessive pump displacement demand by the pressure in feed line 110, the valve element 128 will move downward so that motor line 126 is disconnected from feed line 110 and is instead connected to exhaust 148 and at the same time the other motor line 124 is disconnected from feed line 106 and is instead connected to control line 66. Thus, instead of the swash plate 32 being further turned to increase pump displacement by increased feed pressure in feed line 110 and decreased feed pressure in feed line 106, the angle of the swash plate is decreased by the direct control pressure bias from displacement limiter valve 50 until the hydrostatic system pressure is reduced below this predetermined value. When there is no longer any tendency to exceed this predetermined value the displacement limiter valve 50 resumes its normal condition to reestablish normal control by the displacement control valve 52. Alternatively, when hydrostatic system pressures tends to exceed this predetermined value in the other hydrostatic system line 46 signifying an excessive pump displacement demand by the pressure in feed line 106 the displacement limiter valve 50 moves upward to provide a similar operation to limit high hydrostatic system pressure. This control by displacement limiter valve 50 of the quantity of flow to limit hydrostatic system pressure increases pump efficiency since there is no increased pump flow upon excess pump displacement demand.

During change in pump displacement by displacement control valve 52, the high hydrostatic system pressure in either line 44 or line 46 acting on the respective pistons 166 and 168 provides a force resisting turning of the manual valve element 112 in the direction producing the high hydrostatic system pressure which is indicative of the load. The higher this pressure which in the illustrated use is indicative of the steer load, the higher is the effort required by the operator to increase pump displacement and thus the operator by physically sensing the load can adjust the pump displacement accordingly.

The displacement inhibitor valves 55 and 56 are operable to establish forces on the respective pistons 166 and 168 to inhibit further counterclockwise and clockwise turning, respectively, of the manual valve element 112 of the displacement control valve 52 and thus inhibit further increase in steer bias in the illustrated use. The establishment of these inhibiting forces is under the control of the displacement inhibitor regulator valve 58. For example, when the manual valve element 112 is turned counterclockwise with the high hydrostatic system pressure in line 44, the lug 174 through its contact with the piston 166 causes leftward movement of valve element 182 in displacement inhibitor valve 55 while the other lug 176 moves away from the corresponding valve element of the other displacement inhibitor valve 56. Sufficient movement of valve element 182 with respect to valve element 187 permits delivery of pressure in the hydrostatic system line 44 to chamber 196. The high hydrostatic system pressure thus admitted to chamber 196 then opposes further movement of valve element 182 and thus further increase in pump displacement. Thus, this relative valve element movement determines the pump displacement limit and varies with the position of the outer valve element 187. Positioning of valve element 187 is determined by the pressure in chamber 208 which opposes the bias of spring 190. With the valve element 187 in its extreme righthand position as shown, only minimum travel of valve element 182 relative to valve element 187 is possible before the inhibiting system pressure is delivered to the chamber 196. This minimum relative valve element movement thus determines the lowest pump displacement limit. With the pressure in chamber 208 increasing with increasing engine speed and transmission output speed, the valve element 187 is moved leftward accordingly. This has the effect of increasing the distance that valve element 182 can move leftward relative to valve element 187 before chamber 196 is pressurized so that increased turning of the displacement control valve element 112 and thus increased pump displacement is possible. When valve element 187 is moved to its extreme lefthand position, there is permitted maximum relative valve element movement before the inhibiting force is made available and this determines the highest pump displacement limit. This same type of operation is provided by the other displacement inhibitor valve 56 when the pump displacement is controlled by turning the manual steer valve element 112 in the opposite or clockwise direction.

Thus, the displacement inhibitor control valve 58 and two displacement inhibitor valves 55 and 56 cooperatively inhibit pump displacement according to engine speed and output speed. This operation is particularly useful in the illustrated usage by its limiting the absorption capacity of the hydrostatic pump to prevent stalling the engine during steering when engine speed and transmission output speed are low.

The above described preferred embodiment is illustrative of the invention which may be modified within the scope of the appended claims.

We claim:

1. In a hydrostatic displacement control system the combination of a variable ratio hydrostatic unit including a hydrostatic motor powered by an engine driven variable displacement hydrostatic pump, a pair of displacement control motor means operable when provided with a pressure balance to fix pump displacement and operable when provided with a pressure imbalance to vary pump displacement, a fluid pressure source, control pressure regulator valve means operatively connected to said pressure source for providing a regulated control pressure increasing with increasing pump outlet pressure, manually operable displacement control valve means operable to use said control pressure to selectively establish a pressure balance and pressure imbalance at said displacement control motors, displacement limiter valve means responsive to a predetermined pump outlet pressure to interrupt the normal control by said displacement control valve means and establish a pressure imbalance at said displacement control motors by delivering said control pressure directly to one displacement control motor while exhausting pressure from the other displacement control motor to decrease pump displacement to prevent pump outlet pressure from exceeding said predetermined pressure, load feel means using pump outlet pressure to provide a force acting on said displacement control valve means increasing with increasing pump outlet pressure to resist operation of said displacement control valve means to increase pump displacement, displacement inhibitor control valve means for using said control pressure to provide a displacement inhibitor control pressure indicative of engine speed and hydrostatic motor speed, displacement inhibitor valve means operable in an inhibiting condition to establish an inhibiting force acting on said manual displacement control valve means to inhibit further pump displacement demand by said displacement control valve means, and said displacement inhibitor valve means including force inhibiting conditioning means for responding to said displacement inhibitor control pressure to vary the inhibiting condition at which said displacement inhibitor valve means establishes said inhibiting force in accordance with engine speed and hydrostatic motor speed.

2. In a hydrostatic displacement control system the combination of a variable ratio hydrostatic unit including a hydrostatic motor powered by an engine driven variable displacement hydrostatic pump, a pair of displacement control motor means operable when provided with a pressure balance to fix pump displacement and operable when provided with a pressure imbalance to vary pump displacement, a fluid pressure source, control pressure regulator valve means operatively connected to said pressure source for providing a regulated control pressure, manually operable displacement control valve means operable to use said control pressure to selectively establish a pressure balance and pressure imbalance at said displacement control motors, displacement limiter valve means responsive to a predetermined pump outlet pressure to interrupt the normal control by said displacement control valve means and establish a pressure imbalance at said displacement control motors by delivering said control pressure directly to one displacement control motor while exhausting pressure from the other displacement control motor to control pump displacement to prevent pump outlet pressure from exceeding said predetermined pressure, load feel means using pump outlet pressure to provide a force acting on said displacement control valve means increasing with increasing pump outlet pressure to resist operation of manual displacement control valve means to increase pump displacement, displacement inhibitor control valve means for using said control pressure to provide a displacement control pressure indicative of engine performance, displacement inhibitor valve means operable in an inhibiting condition to establish an inhibiting force acting on said manual displacement control valve means to inhibit further pump displacement demand by said displacement control valve means, and said displacement inhibitor valve means including force inhibiting conditioning means for responding to said displacement inhibitor control pressure to vary the inhibiting condition at which said displacement inhibitor valve means establishes said inhibiting force in accordance with engine performance.

3. In a hydrostatic displacement control system the combination of a variable ratio hydrostatic unit including a hydrostatic motor powered by an engine driven variable displacement hydrostatic pump, a pair of displacement control motor means operable when provided with a pressure balance to fix pump displacement and operable when provided with a pressure imbalance to vary pump displacement, a fluid pressure source, control pressure regulator valve means operatively connected to said pressure source for providing a regulated control pressure, manually operable displacement control valve means operable to use said control pressure to selectively establish a pressure balance and pressure imbalance at said displacement control motors, displacement inhibitor control valve means for using said control pressure to provide a displacement inhibitor control pressure indicative of engine performance, displacement inhibitor valve means operable in an inhibiting condition to establish an inhibiting force acting on said displacement control valve means to inhibit further pump displacement demand by said displacement control valve means, and said displacement inhibitor valve means including force inhibiting conditioning means for responding to said displacement inhibitor control pressure to vary the inhibiting condition at which said displacement inhibitor valve means establishes said inhibiting force in accordance with engine performance.

4. The hydrostatic displacement control system set forth in claim 3 and engine driven governor means providing a bias on said displacement inhibitor control valve means to increase said displacement inhibitor control pressure with increasing engine speed so that said inhibiting force is made available according to engine speed to permit increasing pump displacement with increasing engine speed.

5. The hydrostatic displacement control system set forth in claim 3 and governor means driven with the hydrostatic motor providing a bias on said displacement inhibitor control valve means to increase said displacement inhibitor control pressure with increasing hydrostatic motor speed so that said inhibiting force is made available according to hydrostatic motor speed to permit increasing pump displacement with increasing hydrostatic motor speed.

6. The hydrostatic displacement control system set forth in claim 5 and governor means driven with the hydrostatic motor providing a bias on said displacement inhibitor control valve means to increase said displacement inhibitor control pressure with increasing hydrostatic motor speed so that said inhibiting force is made available according to hydrostatic motor speed to permit increasing pump displacement with increasing hydrostatic motor speed.

7. In a hydrostatic displacement control system the combination of a variable ratio hydrostatic unit including a hydrostatic motor powered by an engine driven variable displacement hydrostatic pump, a pair of displacement control motor means operable when provided with a pressure balance to fix pump displacement and operable when provided with a pressure imbalance to vary pump displacement, a fluid pressure source, control pressure regulator valve means operatively connected to said pressure source for providing a regulated control pressure, manually operable displacement control valve means operable to use said control pressure to selectively establish a pressure balance and pressure imbalance at said displacement control motors, load feel means using pump outlet pressure to provide a force acting on said displacement control valve means increasing with increasing pump outlet pressure to resist operation of said displacement control valve means to increase pump displacement.

8. In a hydrostatic displacement control system the combination of a variable ratio hydrostatic unit including a hydrostatic motor powered by an engine driven variable displacement hydrostatic pump, a pair of displacement control motor means operable when provided with a pressure balance to fix pump displacement and operable when provided with a pressure imbalance to vary pump displacement, a fluid pressure source, control pressure regulator valve means operatively connected to said pressure source for providing a regulated control pressure, manually operable displacement control valve means operable to use said control pressure to selectively establish a pressure balance and pressure imbalance at said displacement control motors, and displacement limiter valve means responsive to a predetermined pump outlet pressure to interrupt the normal control by said displacement control valve means and establish a pressure imbalance at said displacement control motors by delivering said control pressure directly to one displacement control motor while exhausting pressure from the other displacement control motor to decrease pump displacement to prevent pump outlet pressure from exceeding said predetermined pressure.

References Cited
UNITED STATES PATENTS

| | | | |
|---|---|---|---|
| 3,230,699 | 1/1966 | Hann et al. | 60—19 |
| 3,247,669 | 4/1966 | Hann | 60—19X |
| 3,475,903 | 11/1969 | Christenson | 60—19 |
| 3,495,405 | 2/1970 | Marlow | 60—19X |

EDGAR W. GEOGHEGAN, Primary Examiner

U.S. Cl. X.R.

60—53

PO-1050
(5/69)

UNITED STATES PATENT OFFICE
CERTIFICATE OF CORRECTION

Patent No. 3,553,962          Dated January 12, 1971

Inventor(s) Carl R. Potter, James J. Mooney, Jr.

It is certified that error appears in the above-identified patent and that said Letters Patent are hereby corrected as shown below:

Column 1, line 14 from bottom, "spash" should be -- swash --. Column 6, line 30, "128" should be -- 138 --; line 68, "pum" should be -- pump --. Column 7, line 8, "ane" should be -- an --. Column 8, line 18, "arta" should be -- area --; lines 44 and 45, cancel "hibited as described in more detail later. The other dis- at which further increase in pump displacement is in-" should be -- at which further increase in pump displacement is inhibited as described in more detail later. The other dis- --. Column 10, line 41, "pressures" should be -- pressure --.

Signed and sealed this 8th day of June 1971.

(SEAL)
Attest:

EDWARD M. FLETCHER, JR.
Attesting Officer

WILLIAM E. SCHUYLER, JR.
Commissioner of Patents